United States Patent
Takakura (10) Patent No.: US 11,999,587 B2
(45) Date of Patent: Jun. 4, 2024

(54) AUTOMATIC DOCUMENT FEEDER, IMAGE FORMING APPARATUS, AND FAULT DETECTION METHOD

(71) Applicant: TOSHIBA TEC KABUSHIKI KAISHA, Tokyo (JP)

(72) Inventor: Kensuke Takakura, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 177 days.

(21) Appl. No.: 17/852,438

(22) Filed: Jun. 29, 2022

(65) Prior Publication Data

US 2024/0002180 A1 Jan. 4, 2024

(51) Int. Cl.
   *B65H 7/12* (2006.01)
   *H04N 1/00* (2006.01)
   *H04N 1/32* (2006.01)

(52) U.S. Cl.
   CPC ......... *B65H 7/125* (2013.01); *H04N 1/00729* (2013.01); *H04N 1/3263* (2013.01);
   (Continued)

(58) Field of Classification Search
   CPC ............... B65H 7/125; B65H 2553/30; H04N 1/00729; H04N 1/3263; H04N 1/32651; H04N 1/32673; H04N 1/32694
   See application file for complete search history.

(56) References Cited

U.S. PATENT DOCUMENTS

2005/0269759 A1* 12/2005 Sano ............... B65H 7/125 343/700 MS
2020/0039774 A1* 2/2020 Yamada ............ G01N 29/04
(Continued)

FOREIGN PATENT DOCUMENTS

JP 2019-127365 8/2019

*Primary Examiner* — Nicholas Pachol
(74) *Attorney, Agent, or Firm* — Amin, Turocy & Watson, LLP (57) ABSTRACT

The automatic document feeder includes a multi-feed detection sensor unit, a sensor control unit, and a control board on which the sensor control unit is mounted. The multi-feed detection sensor unit includes a transmission board on which a transmission sensor and a detection circuit of a drive current of the transmission sensor are mounted, a reception board on which a reception sensor and an amplifier circuit of a reception signal of the reception sensor are mounted, and a relay board on which a drive circuit of the transmission sensor is mounted. The sensor control unit stores first fault information indicating that the relay board is disconnected if the relay board is disconnected, stores second fault information indicating that the reception board is at fault if an output value of the amplifier circuit is equal to or less than a first threshold, stores third fault information indicating that the transmission board is at fault if the detection circuit does not detect the drive current, and stores fourth fault information indicating that the transmission sensor or the reception sensor is damaged if the output value of the amplifier circuit is equal to or less than a second threshold. If the fault information is stored, the sensor control unit transmits, to an image forming apparatus, an instruction signal for causing the fault information to be displayed.

20 Claims, 7 Drawing Sheets

(52) U.S. Cl.
CPC ..... *H04N 1/32651* (2013.01); *H04N 1/32673* (2013.01); *H04N 1/32694* (2013.01); *B65H 2553/30* (2013.01)

(56) References Cited

U.S. PATENT DOCUMENTS

2022/0263962 A1* 8/2022 Murahashi ............... G01V 8/12
2022/0356024 A1* 11/2022 Ohashi .................. B65H 7/125
2023/0070418 A1* 3/2023 Eguchi .................. B65H 7/125

* cited by examiner

AUTOMATIC DOCUMENT FEEDER, IMAGE FORMING APPARATUS, AND FAULT DETECTION METHOD

FIELD

Embodiments described herein relate to an automatic document feeder, an image forming apparatus, and a fault detection method.

BACKGROUND

In an automatic document feeder, it is required to accurately separate and convey documents stacked on a tray one by one. Multi-feed in which two or more documents are conveyed in an overlapping manner causes malfunctions and damages to the documents.

In order to avoid the multi-feed, a multi-feed detection sensor is used to detect that two or more documents are conveyed in an overlapping manner. The multi-feed detection sensor includes a transmission sensor and a reception sensor that face each other with a conveyance path interposed therebetween. In general, an ultrasonic sensor that is not affected by a color or a transmittance of a document is used as the transmission sensor and the reception sensor. An ultrasonic wave transmitted by the transmission sensor is received by the reception sensor and is converted into an electric signal, and the electric signal is output. The amount of attenuation of the ultrasonic wave received by the reception sensor changes depending on presence or absence of a document and the number of documents between the transmission sensor and the reception sensor. The multi-feed can be detected by comparing an amplitude of an output of the reception sensor with a predetermined threshold.

DETAILED DESCRIPTION

In general, according to one embodiment, an automatic document feeder configured to feed documents one by one to an image reading device of an image forming apparatus is provided. The automatic document feeder includes a multi-feed detection sensor unit configured to detect multi-feed of the documents, a sensor control unit configured to control the multi-feed detection sensor unit, and a control board on which the sensor control unit is mounted. The multi-feed detection sensor unit includes a transmission board on which a transmission sensor and a current detection circuit are mounted, a reception board on which a reception sensor and an amplifier circuit are mounted, and a relay board on which a drive circuit and a comparator are mounted. The transmission sensor transmits a detection wave. The current detection circuit detects a drive current supplied to the transmission sensor. The reception sensor receives the detection wave. The amplifier circuit amplifies an amplitude of a reception signal of the reception sensor. The drive circuit supplies the drive current to the transmission sensor. The comparator compares an output value of the amplifier circuit with a threshold set by the sensor control unit. When the image forming apparatus is activated and returned, the sensor control unit detects a fault in the multi-feed detection sensor unit. The sensor control unit checks connection between the control board and the relay board, and stores first fault information indicating disconnection of the relay board if the relay board is in a disconnected state. The sensor control unit sets the threshold to a first threshold, and stores second fault information indicating that the reception board is at fault if a comparison result of the comparator indicates that the output value of the amplifier circuit is equal to or less than the first threshold. The sensor control unit causes the drive circuit to start supplying the drive current, and stores third fault information indicating that the transmission board is at fault if the current detection circuit does not detect the drive current. The sensor control unit sets the threshold to a second threshold, and stores fourth fault information indicating that the transmission sensor or the reception sensor is damaged if the comparison result of the comparator indicates that the output value of the amplifier circuit is equal to or less than the second threshold. The sensor control unit causes the drive circuit to stop supplying the drive current. The sensor control unit determines whether any of the first fault information to the fourth fault information is stored, and transmits, to the image forming apparatus, an instruction signal for causing the fault information to be displayed on an operation and display unit of the image forming apparatus if the fault information is stored.

Functional Configuration

Figure 1:
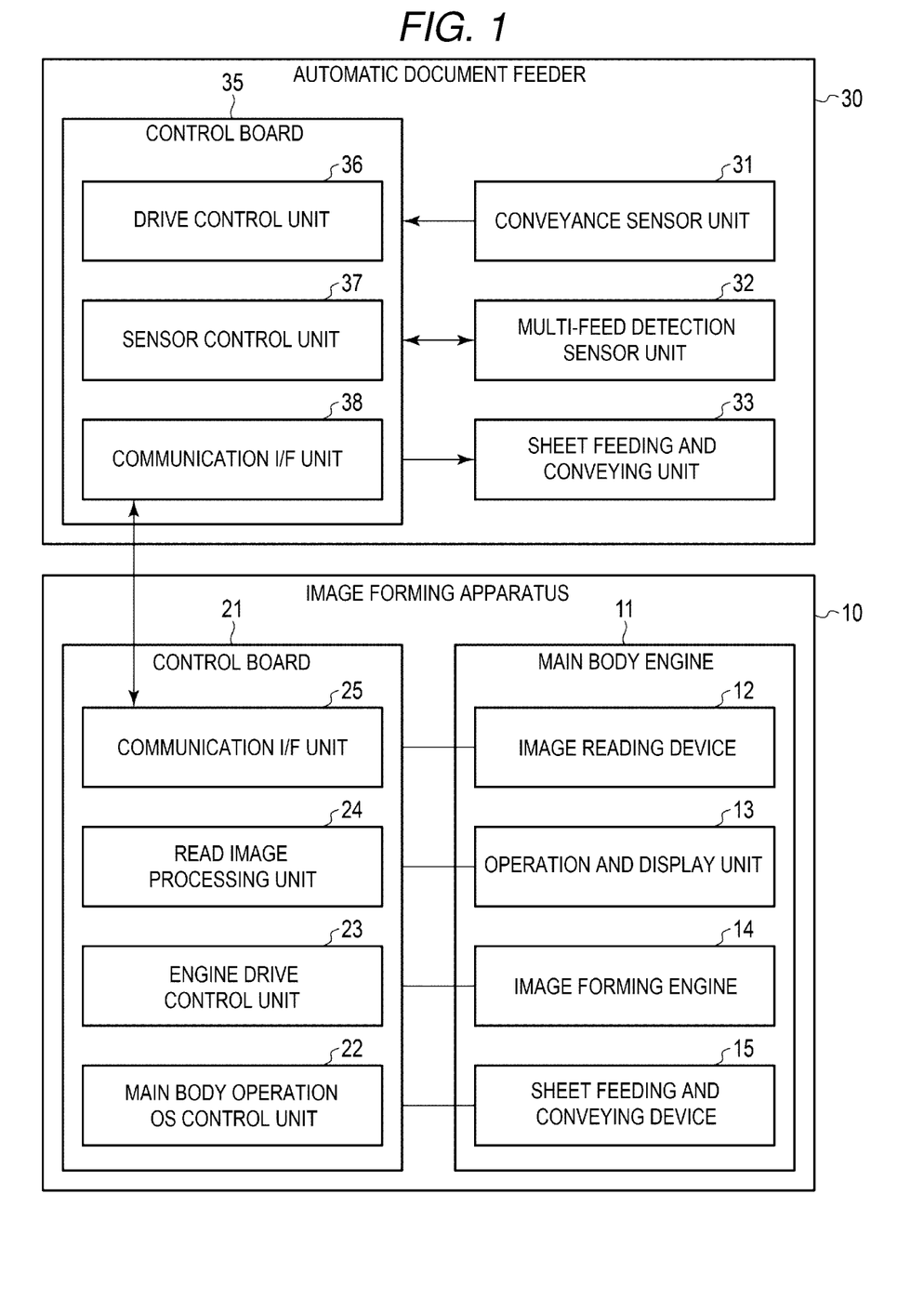
FIG. 1 is a block diagram illustrating an example of a functional configuration of an image forming apparatus according to an embodiment.

First, a functional configuration of an image forming apparatus 10 according to an embodiment will be described with reference to FIG. 1. FIG. 1 is a block diagram illustrating an example of the functional configuration of the image forming apparatus 10 according to the embodiment.

The image forming apparatus 10 is, for example, a multi function peripheral (MFP), and has a plurality of functions such as a printing function, an image reading function, and a copying function.

The image forming apparatus 10 includes a main body engine 11. The main body engine 11 includes an image reading device 12, an operation and display unit 13, an image forming engine 14, and a sheet feeding and conveying device 15.

The image reading device 12 reads an image recorded on a document or the like using a sensor such as a contact image sensor (CIS) or a charge coupled device (CCD), and generates image data.

The operation and display unit 13 displays information and receives an instruction in order for a user to operate the image forming apparatus 10. For example, the operation and display unit 13 includes a touch panel, and displays operation buttons of icons on the touch panel.

The image forming engine 14 forms an image on a sheet using toner based on the image data read by the image reading device 12 or the image data received from an external device. Therefore, the image forming engine 14 includes a photoconductor unit, a toner unit, and the like.

The sheet feeding and conveying device 15 takes out a sheet from a sheet feeding cassette that accommodates sheets, supplies the sheet to the image forming engine 14, and conveys the sheet on which an image is formed to a sheet discharge tray.

The image forming apparatus 10 also includes a control board 21. The control board 21 includes a main body operation OS control unit 22, an engine drive control unit 23, a read image processing unit 24, and a communication I/F unit 25.

The main body operation OS control unit 22 controls basic operations of the main body engine 11. The engine drive control unit 23 controls driving of the image reading device 12, the operation and display unit 13, the image forming engine 14, and the sheet feeding and conveying device 15 of the main body engine 11. The read image processing unit 24 processes the image data read by the image reading device 12. The communication I/F unit 25 transmits and receives information and signals to and from a communication I/F unit 38 of an automatic document feeder described later.

The image forming apparatus 10 also includes the automatic document feeder 30. The automatic document feeder is a device that feeds documents one by one to the image reading device 12.

The automatic document feeder 30 includes a conveyance sensor unit 31, a multi-feed detection sensor unit 32, a sheet feeding and conveying unit 33, and a control board 35.

The sheet feeding and conveying unit 33 conveys the documents via the image reading device 12. The conveyance sensor unit 31 detects a problem in conveyance of the documents, such as a sheet jam. The multi-feed detection sensor unit 32 detects multi-feed of the documents, that is, the conveyance of the overlapped documents.

The control board 35 includes a drive control unit 36, a sensor control unit 37, and a communication I/F unit 38. The drive control unit 36 controls the sheet feeding and conveying unit 33. The sensor control unit 37 controls the multi-feed detection sensor unit 32. The communication I/F unit 38 transmits and receives information and signals to and from the communication I/F unit 25 of the image forming apparatus 10.

Mechanical Configuration

Figure 2:
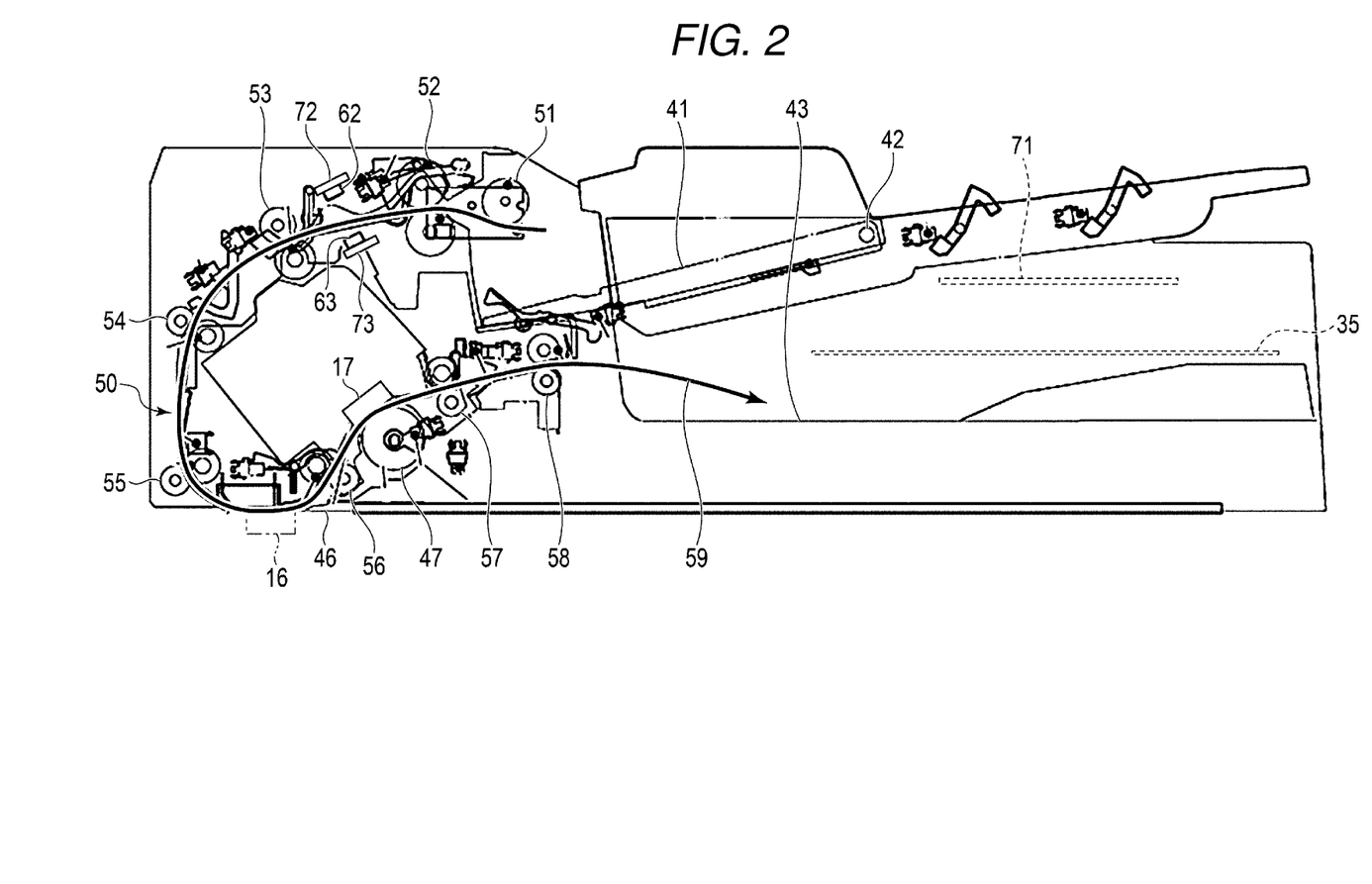
FIG. 2 is a diagram illustrating an example of a mechanical configuration of an automatic document feeder.

Next, a mechanical configuration of the automatic document feeder 30 according to the embodiment will be described with reference to FIG. 2. FIG. 2 is a diagram illustrating an example of the mechanical configuration of the automatic document feeder 30 according to the embodiment.

The automatic document feeder 30 includes a document tray 41, a sheet discharge tray 43, and a conveyance mechanism 50. The document tray 41, the sheet discharge tray 43, and the conveyance mechanism 50 constitute the sheet feeding and conveying unit 33.

One or more documents before reading are placed on the document tray 41. At the time of reading, the document tray 41 is raised about a shaft 42 to provide the documents to the conveyance mechanism 50.

The conveyance mechanism 50 conveys the documents placed on the document tray 41 one by one to the sheet discharge tray 43 via a first image reading sensor 16 and a second image reading sensor 17 of the image reading device 12 along a conveyance path indicated by an arrow 59. The sheet discharge tray 43 receives the documents after being read.

The conveyance mechanism 50 includes, in an order along the conveyance path, a pickup roller 51, a sheet feeding roller pair 52, a first intermediate conveyance roller pair 53, a second intermediate conveyance roller pair 54, a pre-reading roller pair 55, a first post-reading roller pair 56, a second post-reading roller pair 57, and a sheet discharge roller pair 58.

At the time of reading, the document tray 41 is raised about the shaft 42 and the documents are pressed against the pickup roller 51. The pickup roller 51 rotates to feed a top document to the sheet feeding roller pair 52. The sheet feed roller pair 52, the first intermediate conveyance roller pair 53, the second intermediate conveyance roller pair 54, the pre-reading roller pairs 55, the first post-reading roller pair 56, the second post-reading roller pair 57, and the sheet discharge roller pair 58 all rotate to feed out the document.

A reading slit 46 is provided between the pre-reading roller pair 55 and the first post-reading roller pair 56. When the document passes through the reading slit 46, one side, for example, a front side of the document is exposed downward. The first image reading sensor 16 is provided below the reading slit 46. The first image reading sensor 16 reads one side, for example, the front side of the document.

The second image reading sensor 17 and a facing roller 47 are provided between the first post-reading roller pair 56 and the second post-reading roller pair 57. The second image reading sensor 17 and the facing roller 47 face each other. The second post-reading roller pair 57 feeds the document between the second image reading sensor 17 and the facing roller 47. The second image reading sensor 17 reads the other side, for example, a back side of the document when the document passes through the second image reading sensor 17. The facing roller 47 prevents floating of the document from the second image reading sensor 17.

The second post-reading roller pair 57 feeds out the document that passed through the second image reading sensor 17 to the sheet discharge roller pair 58. The sheet discharge roller pair 58 feeds out the document to the sheet discharge tray 43.

Functional Configuration

Figure 3:
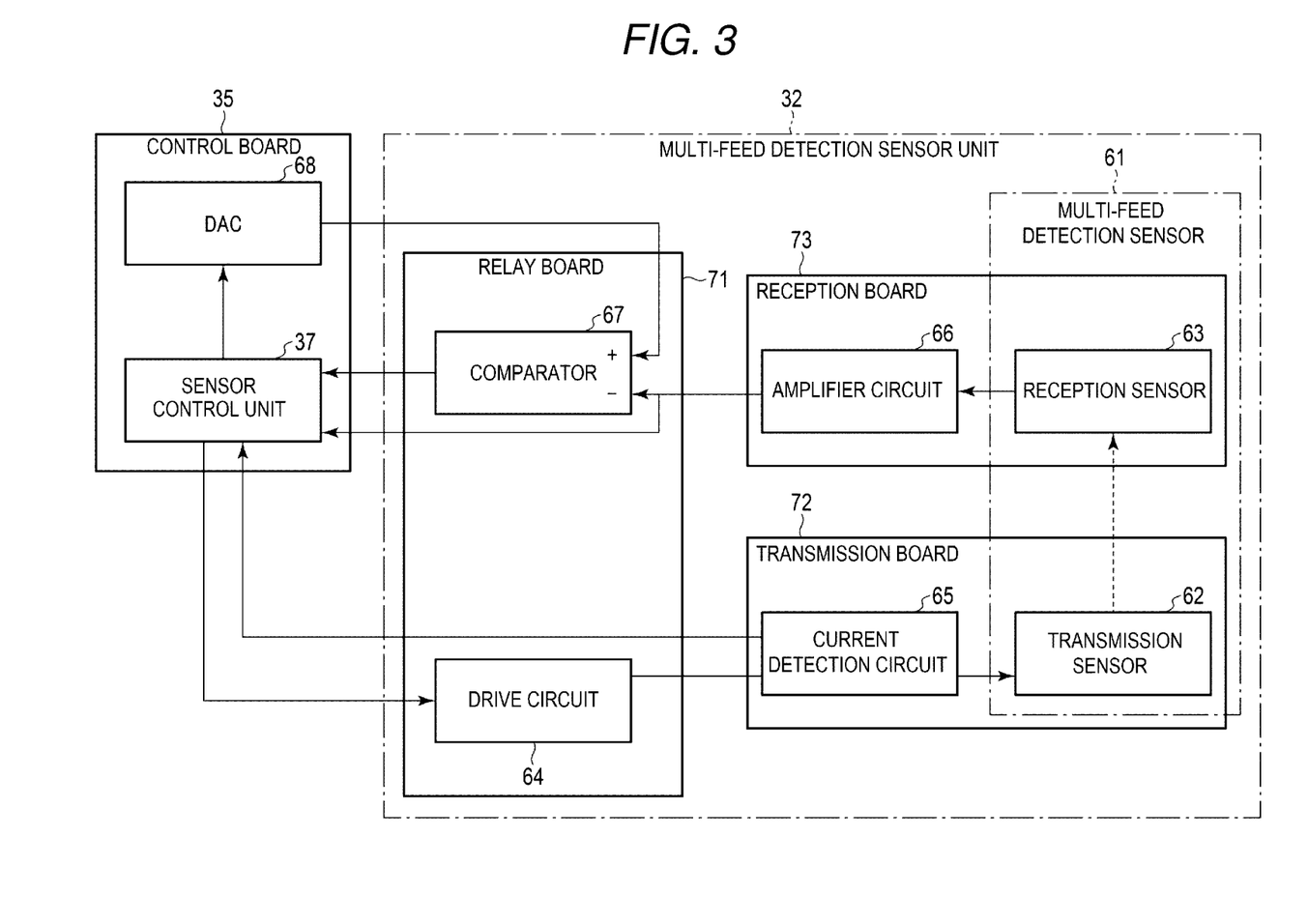
FIG. 3 is a block diagram illustrating an example of a functional configuration of a multi-feed detection sensor unit.

Next, a functional configuration of the multi-feed detection sensor unit 32 according to the embodiment will be described with reference to FIG. 3. FIG. 3 is a block diagram illustrating an example of the functional configuration of the multi-feed detection sensor unit 32 according to the embodiment.

The multi-feed detection sensor unit 32 includes a multi-feed detection sensor 61, a drive circuit 64, a current detection circuit 65, an amplifier circuit 66, and a comparator 67.

The multi-feed detection sensor 61 includes a transmission sensor 62 and a reception sensor 63. For example, both the transmission sensor 62 and the reception sensor 63 are ultrasonic sensors. The transmission sensor 62 transmits a detection wave corresponding to a supplied drive current. The reception sensor 63 receives the detection wave transmitted by the transmission sensor 62 and outputs a reception signal corresponding to the received detection wave.

The drive circuit 64 supplies the drive current to the transmission sensor 62. For example, the drive current is a rectangular pulse current.

The current detection circuit 65 detects the drive current supplied to the transmission sensor 62. For example, the current detection circuit 65 is a circuit that detects a change in a magnetic flux using a Hall element. The current detection circuit 65 transmits a detection signal of the drive current to the sensor control unit 37.

The amplifier circuit 66 amplifies an amplitude of the reception signal of the reception sensor 63. The amplifier circuit 66 has a smoothing function and outputs a substantially DC voltage signal indicating the amplitude of the reception signal of the reception sensor 63. An output voltage value of the amplifier circuit 66 is a sum of an offset voltage value of the reception sensor 63 and an amplitude voltage value of the reception signal. Here, the offset voltage value is an output voltage value of the reception sensor 63 at the time of non-driving.

The comparator 67 compares the output voltage value of the amplifier circuit 66 with a threshold set by the sensor control unit 37, and outputs a comparison result to the sensor control unit 37. The threshold is input to one input terminal, for example, a positive input terminal of the comparator 67 via a DAC 68. The output voltage value of the amplifier circuit 66 is input to the other input terminal, for example, a negative input terminal of the comparator 67. The comparator 67 outputs a comparison result of High or Low.

The multi-feed detection sensor unit 32 also includes a relay board 71, a transmission board 72, and a reception board 73. The relay board 71 is mounted with the drive circuit 64 and the comparator 67. The transmission board 72 is mounted with the transmission sensor 62 and the current detection circuit 65. The reception board 73 is mounted with the reception sensor 63 and the amplifier circuit 66.

As illustrated in FIG. 2, the transmission board 72 and the reception board 73 are disposed such that the transmission sensor 62 and the reception sensor 63 face each other with the conveyance path of the conveyance mechanism interposed therebetween. The control board 35 and the relay board 71 are disposed in a housing of the automatic document feeder 30.

Hardware Configuration

Figure 4:
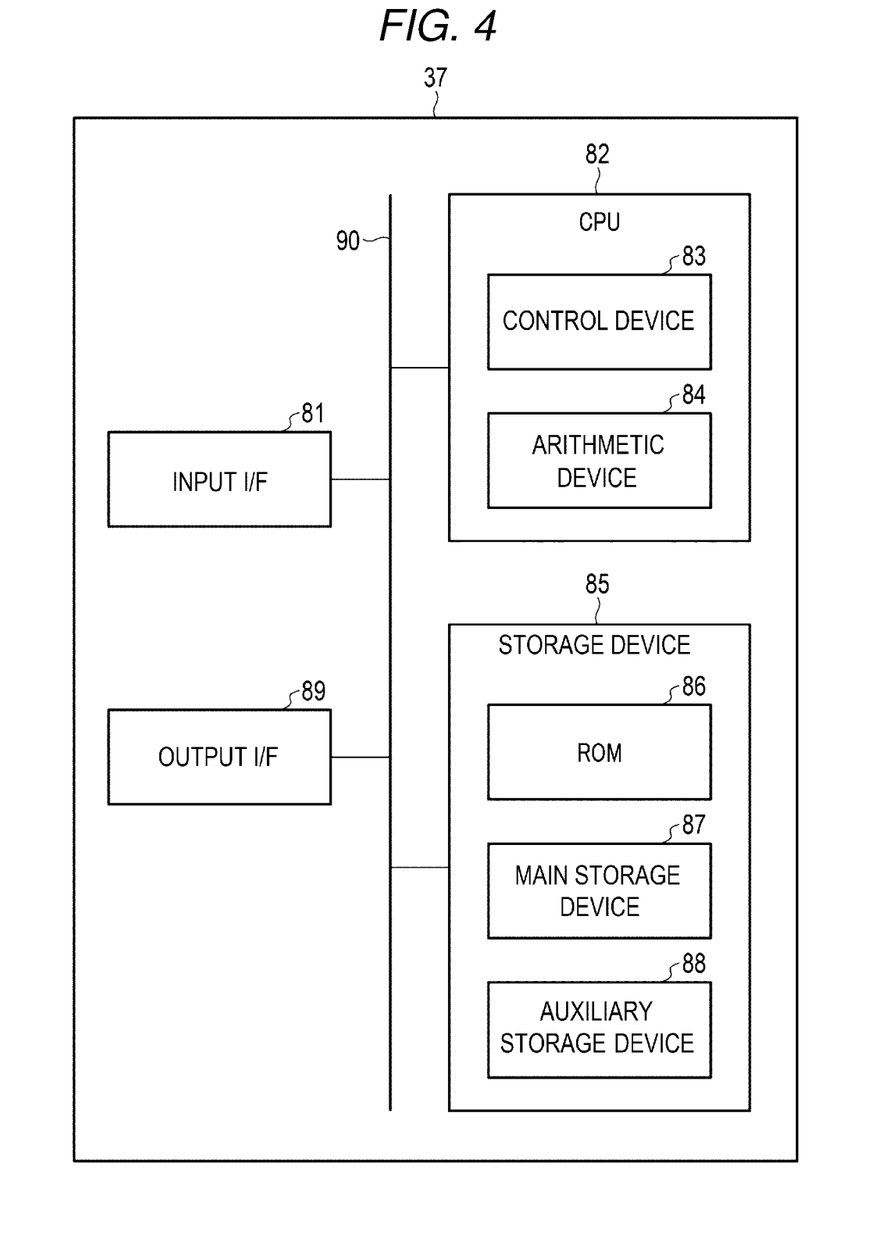
FIG. 4 is a block diagram illustrating an example of a hardware configuration of a sensor control unit.

Next, a hardware configuration of the sensor control unit 37 of the automatic document feeder 30 will be described. The sensor control unit 37 is implemented by a computer. For example, the sensor control unit 37 is implemented by a personal computer, a server computer, or the like.

FIG. 4 is a block diagram illustrating an example of the hardware configuration of the sensor control unit 37 according to the embodiment. As illustrated in FIG. 4, the sensor control unit 37 includes an input I/F 81, a CPU 82, a storage device 85, and an output I/F 89. The sensor control unit 37 may further include other peripheral devices in addition to the input I/F 81, the CPU 82, the storage device 85, and the output I/F 89.

The input I/F 81, the CPU 82, the storage device 85, and the output I/F 89 are electrically connected to one another via a bus 90, and exchange data and commands via the bus 90.

The input I/F 81 is a device that receives a signal from outside, converts the signal into data, and passes the data to the CPU 82 and the storage device 85.

The output I/F 89 is a device that receives the data from the CPU 82 and the storage device 85, converts the data into a signal, and outputs the signal.

The storage device 85 stores programs and data that are necessary for processing executed by the CPU 82. The CPU 82 executes various types of processing by reading and executing the necessary programs and data from the storage device 85.

The storage device 85 includes a ROM 86, a main storage device 87, and an auxiliary storage device 88. The main storage device 87 and the auxiliary storage device 88 exchange programs and data with each other.

The ROM 86 stores a program (BIOS) for controlling the CPU 82 at the time of activation.

The main storage device 87 stores programs and data that are temporarily necessary for the processing of the CPU 82. For example, the main storage device 87 is a volatile memory such as a random access memory (RAM).

The auxiliary storage device 88 stores programs and data that are supplied via an external device or a network, and provides the main storage device 87 with the programs and data that are temporarily necessary for the processing of the CPU 82. For example, the auxiliary storage device 88 is a nonvolatile memory such as a hard disk drive (HDD) or a solid state drive (SSD).

The CPU 82 is a processor and is hardware that processes data and commands. The CPU 82 includes a control device 83 and an arithmetic device 84.

The control device 83 controls the input I/F 81, the arithmetic device 84, the storage device 85, and the output I/F 89.

The arithmetic device 84 reads a program and data from the main storage device 87, executes the program and processes the data, and provides the processed data to the main storage device 87.

In such a hardware configuration, the CPU 82 and the storage device 85 constitute the sensor control unit 37.

For example, the CPU 82 reads a program for executing a function of the sensor control unit 37 from the auxiliary storage device 88 into the main storage device 87, and executes the read program to operate the sensor control unit 37.

The main body operation OS control unit 22, the engine drive control unit 23, and the read image processing unit 24 of the image forming apparatus 10 may have the same hardware configuration as in FIG. 4.

An entity that executes the operations is, for example, an entity related to a computer, such as hardware, a complex of hardware and software, software, and software being executed. Examples of the entity that executes the operations include, but are not limited to, a process executed on a processor, a processor, an object, an execution file, a thread, a program, and a computer. For example, the sensor control unit 37 or an application executed in the sensor control unit 37 may be an entity that executes the operations. A process or a thread may run a plurality of entities that execute the operations. The entities that execute the operations may be in one sensor control unit 37, or may be distributed to a plurality of sensor control units 37.

The functions described above may be recorded in advance in the apparatus, similar functions may be downloaded from the network to the apparatus, or similar functions stored in a recording medium may be installed in the apparatus. The form of the recording medium may be any form such as a disk ROM or a memory card as long as the recording medium can store a program and can be read by the apparatus. Further, the functions attained by installation or downloading in advance as described above may be achieved in cooperation with an operating system (OS) or the like in the apparatus.

Fault Detection Operation of Multi-Feed Detection Sensor Unit 32

Figure 5:
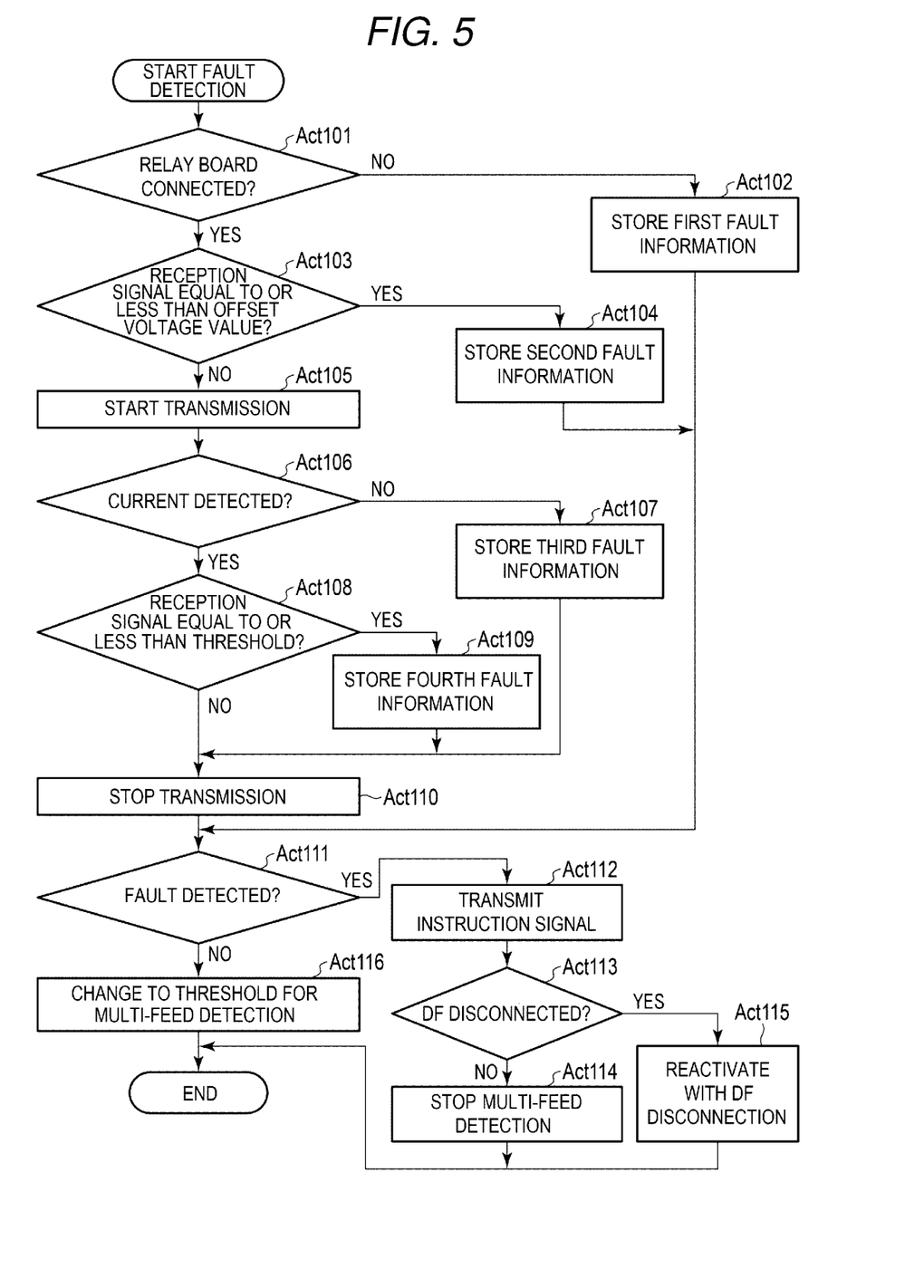
FIG. 5 is a flowchart illustrating a fault detection operation of the multi-feed detection sensor unit.

The sensor control unit 37 detects a fault of the multi-feed detection sensor unit 32 when the image forming apparatus 10 is activated and when the image forming apparatus 10 returns from a power saving mode. Hereinafter, a fault detection operation of the multi-feed detection sensor unit 32 will be described with reference to FIG. 5. FIG. 5 is a flowchart illustrating the fault detection operation of the multi-feed detection sensor unit 32.

First, in Act 101, the sensor control unit 37 checks connection between the control board 35 and the relay board 71. The sensor control unit 37 includes a detection circuit that detects the connection between the control board 35 and the relay board 71.

Figure 6:
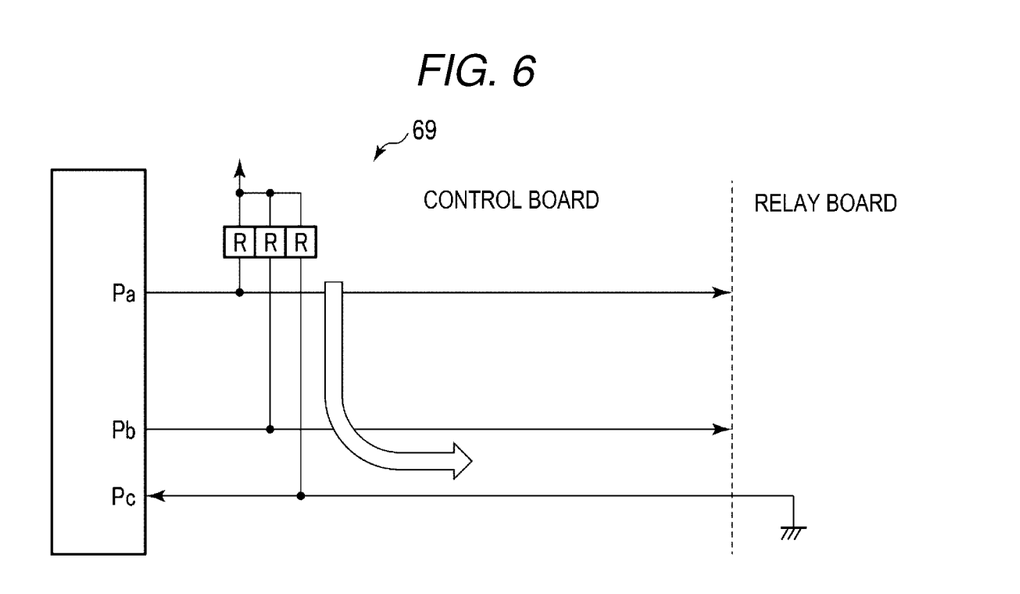
FIG. 6 is a diagram illustrating an example of a detection circuit that detects connection between a control board and a relay board, and illustrating a state in which the relay board is connected.
Figure 7:
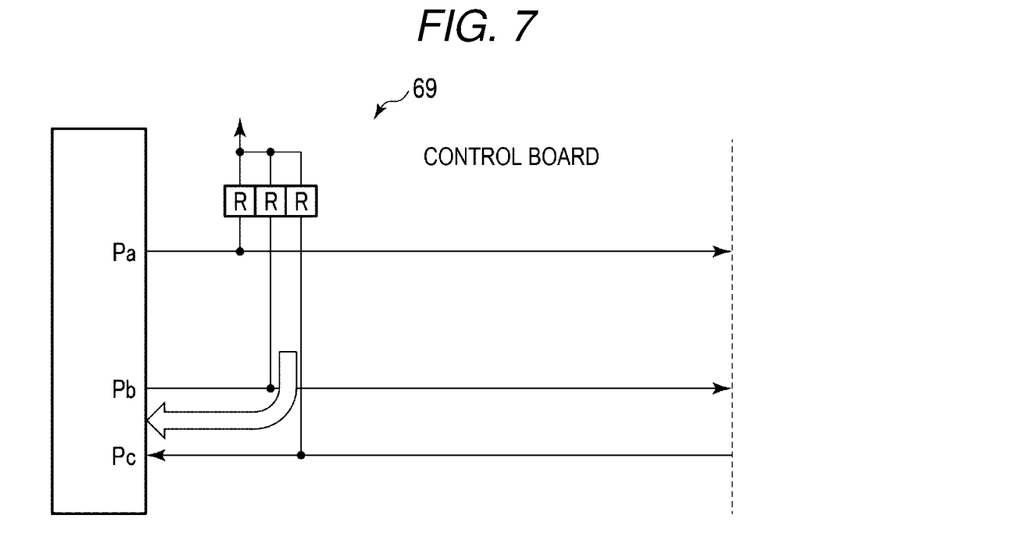
FIG. 7 is a diagram illustrating an example of the detection circuit, and illustrating a state in which the relay board is not connected.

Here, a detection circuit 69 provided in the sensor control unit 37 will be described with reference to FIGS. 6 and 7. FIGS. 6 and 7 are diagrams illustrating an example of the detection circuit 69. FIG. 6 is a diagram illustrating the detection circuit 69 in which the relay board 71 is in a connected state with the control board 35, and FIG. 7 is a diagram illustrating the detection circuit 69 in which the relay board 71 is in a disconnected state with the control board 35.

A positive voltage is applied to a port Pa, and a negative voltage is applied to a port Pb. By checking a voltage level of a port Pc, the sensor control unit 37 determines whether the relay board 71 is connected.

If the relay board 71 is in the connected state with the control board 35, a circuit is formed between the control board 35 and the relay board 71, and thus a current flows to ground as indicated by an arrow in FIG. 6. As a result, the voltage level of the port Pc is Low.

On the other hand, if the relay board 71 is in the disconnected state with the control board 35, no circuit is formed between the control board 35 and the relay board 71, and thus the current flows into the port Pc as indicated by an arrow in FIG. 7. As a result, the voltage level of the port Pc is High.

If the voltage level of the port Pc is Low, the sensor control unit 37 determines that the relay board 71 is in the connected state, and if the voltage level of the port Pc is High, the sensor control unit 37 determines that the relay board 71 is in the disconnected state.

If, as a result of a determination in Act 101, the relay board 71 is in the disconnected state, in Act 102, the sensor control unit 37 stores first fault information indicating the disconnection of the relay board 71.

If, as a result of the determination in Act 101, the relay board 71 is in the connected state, in Act 103, the sensor control unit 37 sets a threshold of the comparator 67 to a first threshold. The first threshold is an offset voltage value of the reception sensor 63. The offset voltage value is an output voltage value of the reception sensor 63 at the time of non-driving. The sensor control unit 37 inputs the offset voltage value to the comparator 67 via the DAC 68. The sensor control unit 37 determines whether the output voltage value (a reception signal) of the amplifier circuit 66 is equal to or less than the offset voltage value based on the comparison result of the comparator 67. In the flowchart in FIG. 5, for convenience, the output voltage value of the amplifier circuit 66 is denoted as the reception signal.

Figure 8:
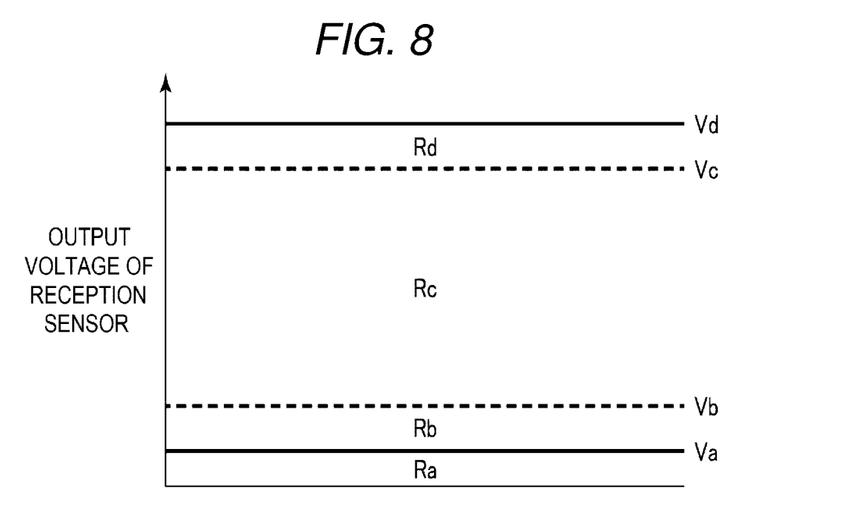
FIG. 8 is a diagram illustrating an output voltage of a reception sensor.

Here, an output voltage of the reception sensor 63 will be described with reference to FIG. 8. FIG. 8 is a diagram illustrating the output voltage of the reception sensor 63. Strictly, the output voltage of the reception sensor 63 on a vertical axis in FIG. 8 is an output voltage of the amplifier circuit 66, but here, for convenience, the output voltage of the amplifier circuit 66 is referred to as the output voltage of the reception sensor 63. The same applies to the following description.

In FIG. 8, a voltage value Va is an offset voltage value of the reception sensor 63. A voltage value Vb is a lower limit value of an output range of the reception signal of the reception sensor 63 when one document is conveyed between the transmission sensor 62 and the reception sensor 63. A voltage value Vc is an upper limit value of the output range of the reception signal of the reception sensor 63 when one document is conveyed between the transmission sensor 62 and the reception sensor 63. A voltage value Vd is the maximum output voltage value of the reception sensor 63.

A region Ra having voltage values lower than the voltage value Va is a region in which the reception board 73 is determined to be at fault. A region Rb having voltage values higher than the voltage value Va and lower than the voltage value Vb is a region in which multi-feed is determined to be performed, that is, a region in which a plurality of documents are determined to be conveyed between the transmission sensor 62 and the reception sensor 63. A region Rc having voltage values higher than the voltage value Vb and lower than the voltage value Vc is a region in which appropriate conveyance is determined to be performed, that is, a region in which one document is determined to be conveyed between the transmission sensor 62 and the reception sensor 63. A region Rd having voltage values higher than the voltage value Vc and lower than the voltage value Vd is a region in which no document is determined to be conveyed between the transmission sensor 62 and the reception sensor 63 or a region in which a fairly thin document is determined to be conveyed between the transmission sensor 62 and the reception sensor 63.

If, as a result of a determination in Act 103, the output voltage value (the reception signal) of the amplifier circuit 66 is equal to or less than the first threshold (the offset voltage value), in Act 104, the sensor control unit 37 stores second fault information indicating that the reception board 73 is at fault.

If, as a result of the determination in Act 103, the output voltage value (the reception signal) of the amplifier circuit 66 is larger than the first threshold (the offset voltage value), in Act 105, the sensor control unit 37 causes the drive circuit 64 to start supplying a drive current. The drive circuit 64 supplies the drive current to the transmission sensor 62 via the current detection circuit 65. The transmission sensor 62 transmits, in response to the supply of the drive current, a detection wave, for example, an ultrasonic wave. The current detection circuit 65 transmits the drive current as feedback to the sensor control unit 37.

In Act 105, the sensor control unit 37 determines whether the drive current is detected by the current detection circuit 65 based on the detection signal of the current detection circuit 65.

If, as a result of a determination in Act 106, the current detection circuit 65 does not detect the drive current, in Act 107, the sensor control unit 37 stores third fault information indicating that the transmission board 72 is at fault.

If, as a result of the determination in Act 106, the current detection circuit 65 detects the drive current, in Act 108, the sensor control unit 37 sets the threshold of the comparator 67 to a second threshold. The second threshold is an upper limit value of the output range of the reception signal of the reception sensor 63 when one document is conveyed between the transmission sensor 62 and the reception sensor 63. The sensor control unit 37 inputs the second threshold to the comparator 67 via the DAC 68. The sensor control unit 37 determines whether the output voltage value (the reception signal) of the amplifier circuit 66 is equal to or less than the second threshold based on the comparison result of the comparator 67.

If, as a result of a determination in Act 108, the output voltage value (the reception signal) of the amplifier circuit 66 is equal to or less than the second threshold, in Act 109, the sensor control unit 37 stores fourth fault information indicating that the transmission sensor 62 or the reception sensor 63 is damaged.

As a result of the determination in Act 108, if the output voltage value (the reception signal) of the amplifier circuit 66 is smaller than the second threshold, in Act 110, the sensor control unit 37 causes the drive circuit 64 to stop supplying the drive current. The transmission sensor 62 stops, in response to the stop of the supply of the drive current, the transmission of the detection wave, for example, the ultrasonic wave. The current detection circuit 65 stops transmitting the drive current as the feedback to the sensor control unit 37.

In Act 111, the sensor control unit 37 determines whether a fault is detected. That is, the sensor control unit 37 determines whether any of the first fault information to the fourth fault information is stored.

If, as a result of a determination in Act 111, the fault information is stored, in Act 112, the sensor control unit 37 transmits an instruction signal for causing the stored fault information to be displayed on the operation and display unit 13 to the image forming apparatus 10.

In addition to the fault information, the sensor control unit 37 also transmits, to the image forming apparatus 10, an instruction signal for causing the operation and display unit 13 to display option information for allowing the user to select either one of a first operation mode in which the function of the multi-feed detection sensor unit 32 is stopped and a second operation mode in which the function of the automatic document feeder 30 is stopped.

In response to the instruction signal, the image forming apparatus 10 displays the fault information and the option information on the operation and display unit 13. Specifically, the engine drive control unit 23 of the image forming apparatus 10 receives the instruction signal transmitted by the sensor control unit 37 via the communication I/F unit 38 and the communication I/F unit 25, and causes the operation and display unit 13 to display the fault information and the option information according to the instruction signal.

Figure 9:
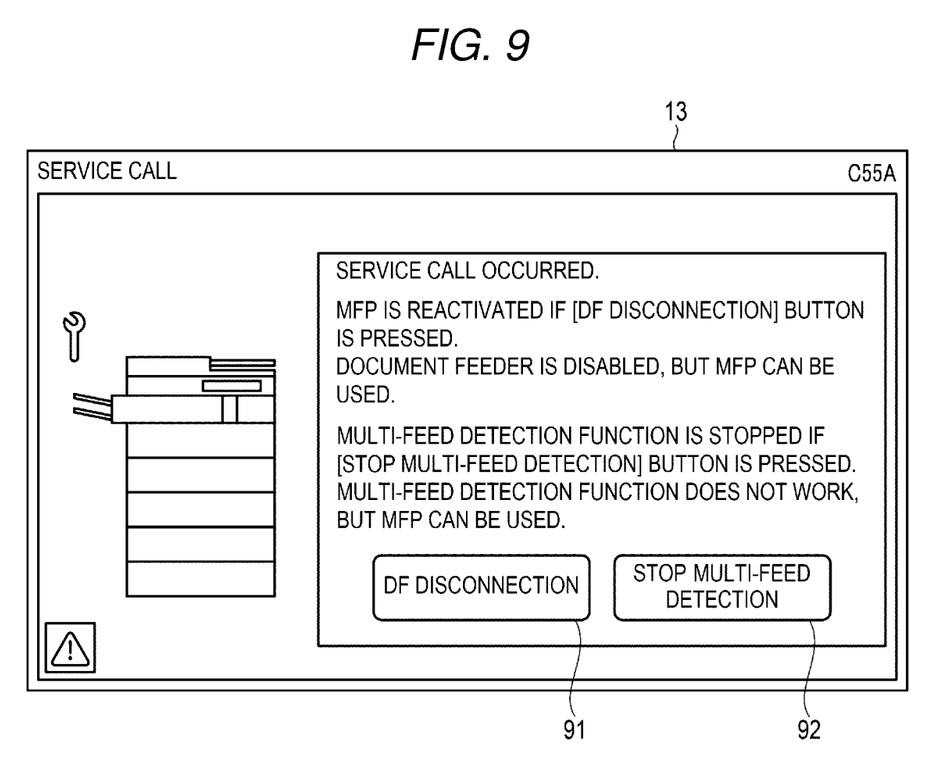
FIG. 9 is a diagram illustrating an operation and display unit that displays fault information and option information.

FIG. 9 is a diagram illustrating the operation and display unit 13 that displays the fault information and the option information. For example, the fault information includes character information of "service call", character information of "C55A" indicating an error code, or character information indicating occurrence of a fault that "service call occurred". The option information includes character information that "MFP is reactivated if [DF disconnection] button is pressed. Document feeder is disabled, but MFP can be used", character information that "multi-feed detection function is stopped if [stop multi-feed detection] button is pressed. Multi-feed detection function does not work, but MFP can be used", an icon of a [DF disconnection] button 91, and an icon of a [stop multi-feed detection] button 92.

Here, the operation and display unit 13 includes a touch panel, and displays the icon of the [DF disconnection] button 91 and the icon of the [stop multi-feed detection] button 92 on the touch panel. The operation and display unit 13 also transmits, to the engine drive control unit 23, a touch operation performed by the user on the icon of the [DF disconnection] button 91 or a touch operation performed by the user on the icon of the [stop multi-feed detection] button 92.

"DF" means the automatic document feeder 30, and "DF disconnection" means that the image forming apparatus 10 is activated without activating the automatic document feeder 30.

In Act 113, if the user selects the first operation mode in which the function of the multi-feed detection sensor unit 32 is stopped, in Act 114, the engine drive control unit 23 transmits an instruction signal for stopping the function of the multi-feed detection sensor unit 32 to the sensor control unit 37 via the communication I/F unit and the communication I/F unit 38. In response to the instruction signal, the sensor control unit 37 stops the function of the multi-feed detection sensor unit 32.

In Act 113, if the user selects the second operation mode in which the function of the automatic document feeder is stopped, in Act 115, the image forming apparatus 10 is reactivated in a mode in which the automatic document feeder 30 is not activated.

If, as a result of the determination in Act 111, the fault information is not stored, in Act 116, the sensor control unit 37 sets the threshold of the comparator 67 to a threshold for the multi-feed detection, that is, a lower limit value of the output range of the reception signal of the reception sensor 63 when one document is conveyed between the transmission sensor 62 and the reception sensor 63 in preparation for the multi-feed detection. As described above, the sensor control unit 37 ends the fault detection operation of the multi-feed detection sensor unit 32.

According to the fault detection operation of the multi-feed detection sensor unit 32 described above, it is possible to separately detect fault locations on a board basis. That is, the faults of the multi-feed detection sensor unit 32 can be detected separately for the disconnection of the relay board 71, the fault of the reception board 73, the fault of the transmission board 72, and the damage of the transmission sensor 62 or the reception sensor 63. Therefore, when there is a fault in the multi-feed detection sensor unit 32, the number of boards to be replaced can be reduced.

When there is a fault in the multi-feed detection sensor unit 32, the image forming apparatus 10 can be used with the function of the multi-feed detection sensor unit 32 stopped in order to prioritize immediate document reading, and the image forming apparatus 10 can be used alone without using the automatic document feeder 30 in order to prioritize safety.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An automatic document feeder configured to feed documents one by one to an image reading device of an image forming apparatus, the automatic document feeder comprising:
a multi-feed detection sensor configured to detect multi-feed of the documents;

a sensor controller configured to control the multi-feed detection sensor; and a control board on which the sensor controller is mounted; wherein the multi-feed detection sensor comprises a transmission sensor configured to transmit a detection wave, a current detection circuit configured to detect a drive current of the transmission sensor, a transmission board on which the transmission sensor and the current detection circuit are mounted, a reception sensor configured to receive the detection wave, an amplifier circuit configured to amplify an amplitude of a reception signal of the reception sensor, a reception board on which the reception sensor and the amplifier circuit are mounted, a drive circuit configured to supply the drive current to the transmission sensor, a comparator configured to compare an output value of the amplifier circuit with a threshold set by the sensor controller, and a relay board on which the drive circuit and the comparator are mounted, and when the image forming apparatus is activated and returned, in order to detect a fault in the multi-feed detection sensor, the sensor controller checks connection between the control board and the relay board, and stores first fault information indicating disconnection of the relay board if the relay board is in a disconnected state, the sensor controller sets the threshold to a first threshold, and stores second fault information indicating that the reception board is at fault if a comparison result of the comparator indicates that the output value of the amplifier circuit is equal to or less than the first threshold, the sensor controller causes the drive circuit to start supplying the drive current, and stores third fault information indicating that the transmission board is at fault if the current detection circuit does not detect the drive current, the sensor controller sets the threshold to a second threshold, and stores fourth fault information indicating that the transmission sensor or the reception sensor is damaged if the comparison result of the comparator indicates that the output value of the amplifier circuit is equal to or less than the second threshold, the sensor controller causes the drive circuit to stop supplying the drive current, and the sensor controller determines whether any of the first fault information to the fourth fault information is stored, and transmits, to the image forming apparatus, an instruction signal for causing the fault information to be displayed on an operation and display component of the image forming apparatus if the fault information is stored.

2. The automatic document feeder according to claim 1, wherein the first threshold is an offset voltage value of the reception sensor, and the second threshold is an upper limit value of an output range of the reception signal of the reception sensor when one document is conveyed between the transmission sensor and the reception sensor.

3. The automatic document feeder according to claim 1, wherein in addition to the fault information, the sensor controller also transmits, to the image forming apparatus, an instruction signal for causing the operation and display component to display option information for allowing a user to select either one of a first operation mode in which a function of the multi-feed detection sensor is stopped and a second operation mode in which a function of the automatic document feeder is stopped.

4. The automatic document feeder according to claim 3, wherein if the user selects the second operation mode, the image forming apparatus is reactivated in a mode in which the automatic document feeder is not activated.

5. The automatic document feeder according to claim 1, wherein if the fault information is not stored, the sensor controller sets the threshold to a lower limit value of an output range of the reception signal of the reception sensor when one document is conveyed between the transmission sensor and the reception sensor.

6. The automatic document feeder according to claim 1, wherein the multi-feed detection sensor detects a sheet jam.

7. The automatic document feeder according to claim 1, wherein the multi-feed detection sensor detects overlapped documents.

8. An image forming apparatus comprising an image reading device, an operation and display component, and an automatic document feeder configured to feed documents one by one to the image reading device, wherein the automatic document feeder comprises a multi-feed detection sensor configured to detect multi-feed of the documents, a sensor controller configured to control the multi-feed detection sensor, and a control board on which the sensor controller is mounted, the multi-feed detection sensor comprises a transmission sensor configured to transmit a detection wave, a current detection circuit configured to detect a drive current of the transmission sensor, a transmission board on which the transmission sensor and the current detection circuit are mounted, a reception sensor configured to receive the detection wave, an amplifier circuit configured to amplify an amplitude of a reception signal of the reception sensor, a reception board on which the reception sensor and the amplifier circuit are mounted, a drive circuit configured to supply the drive current to the transmission sensor, a comparator configured to compare an output value of the amplifier circuit with a threshold set by the sensor controller, and a relay board on which the drive circuit and the comparator are mounted, and when the image forming apparatus is activated and returned, in order to detect a fault in the multi-feed detection sensor, the sensor controller checks connection between the control board and the relay board, and stores first fault information indicating disconnection of the relay board if the relay board is in a disconnected state, the sensor controller sets the threshold to a first threshold, and stores second fault information indicating that the reception board is at fault if a comparison result of the comparator indicates that the output value of the amplifier circuit is equal to or less than the first threshold, the sensor controller causes the drive circuit to start supplying the drive current, and stores third fault information indicating that the transmission board is at fault if the current detection circuit does not detect the drive current, the sensor controller sets the threshold to a second threshold, and stores fourth fault information indicating that the transmission sensor or the reception sensor is damaged if the comparison result of the comparator indicates that the output value of the amplifier circuit is equal to or less than the second threshold, the sensor controller causes the drive circuit to stop supplying the drive current, the sensor controller determines whether any of the first fault information to the fourth fault information is stored, and transmits, to the image forming apparatus, an instruction signal for causing the fault information to be displayed on the operation and display component if the fault information is stored, and the image forming apparatus displays the fault information on the operation and display component.

9. The image forming apparatus according to claim 8, wherein
the first threshold is an offset voltage value of the reception sensor, and
the second threshold is an upper limit value of an output range of the reception signal of the reception sensor when one document is conveyed between the transmission sensor and the reception sensor.

10. The image forming apparatus according to claim 8, wherein
in addition to the fault information, the sensor controller also transmits, to the image forming apparatus, an instruction signal for causing the operation and display component to display option information for allowing a user to select either one of a first operation mode in which a function of the multi-feed detection sensor is stopped and a second operation mode in which a function of the automatic document feeder is stopped, and
the image forming apparatus displays the fault information and the option information on the operation and display component.

11. The image forming apparatus according to claim 10, wherein
if the user selects the second operation mode, the image forming apparatus is reactivated in a mode in which the automatic document feeder is not activated.

12. The image forming apparatus according to claim 8, wherein
if the fault information is not stored, the sensor controller sets the threshold to a lower limit value of an output range of the reception signal of the reception sensor when one document is conveyed between the transmission sensor and the reception sensor.

13. The image forming apparatus according to claim 8, wherein
the multi-feed detection sensor detects a sheet jam.

14. The image forming apparatus according to claim 8, wherein
the multi-feed detection sensor detects overlapped documents.

15. A fault detection method for detecting a fault in a multi-feed detection sensor of an automatic document feeder, wherein
the automatic document feeder is configured to feed documents one by one to an image reading device of an image forming apparatus, and comprises
the multi-feed detection sensor configured to detect multi-feed of the documents,
a sensor controller configured to control the multi-feed detection sensor, and
a control board on which the sensor controller is mounted, and
the multi-feed detection sensor comprises
a transmission sensor configured to transmit a detection wave,
a current detection circuit configured to detect a drive current to be supplied to the transmission sensor,
a transmission board on which the transmission sensor and the current detection circuit are mounted,
a reception sensor configured to receive the detection wave,
an amplifier circuit configured to amplify an amplitude of a reception signal of the reception sensor,
a reception board on which the reception sensor and the amplifier circuit are mounted,
a drive circuit configured to supply the drive current to the transmission sensor,
a comparator configured to compare an output value of the amplifier circuit with a threshold set by the sensor controller, and
a relay board on which the drive circuit and the comparator are mounted,
the fault detection method comprising, when the image forming apparatus is activated and returned:
checking connection between the control board and the relay board, and storing first fault information indicating disconnection of the relay board if the relay board is in a disconnected state;
setting the threshold to a first threshold, and storing second fault information indicating that the reception board is at fault if a comparison result of the comparator indicates that the output value of the amplifier circuit is equal to or less than the first threshold;
causing the drive circuit to start supplying the drive current, and storing third fault information indicating that the transmission board is at fault if the current detection circuit does not detect the drive current;
setting the threshold to a second threshold, and storing fourth fault information indicating that the transmission sensor or the reception sensor is damaged if the comparison result of the comparator indicates that the output value of the amplifier circuit is equal to or less than the second threshold;
causing the drive circuit to stop supplying the drive current; and
determining whether any of the first fault information to the fourth fault information is stored, and displaying the fault information on the image forming apparatus if the fault information is stored.

16. The fault detection method according to claim 15, wherein
the first threshold is an offset voltage value of the reception sensor, and
the second threshold is an upper limit value of an output range of the reception signal of the reception sensor when one document is conveyed between the transmission sensor and the reception sensor.

17. The fault detection method according to claim 15, further comprising:
in addition to the fault information, transmitting, to the image forming apparatus, an instruction signal for causing an operation and display component to display option information for allowing a user to select either one of a first operation mode in which a function of the multi-feed detection sensor is stopped and a second operation mode in which a function of the automatic document feeder is stopped.

18. The fault detection method according to claim 17, further comprising:
if the user selects the second operation mode, reactivating the image forming apparatus in a mode in which the automatic document feeder is not activated.

19. The fault detection method according to claim 15, further comprising:
if the fault information is not stored, setting the threshold to a lower limit value of an output range of the reception signal of the reception sensor when one document is conveyed between the transmission sensor and the reception sensor.

20. The fault detection method according to claim 15, further comprising:
detecting a sheet jam.

* * * * *